UNITED STATES PATENT OFFICE.

OSCAR F. PARSONS, OF EUREKA, IOWA.

FIRE AND WATER PROOF COMPOUND.

SPECIFICATION forming part of Letters Patent No. 300,729, dated June 17, 1884.

Application filed April 19, 1884. (No specimens.)

*To all whom it may concern:*

Be it known that I, OSCAR F. PARSONS, of Eureka, in the county of Adams and State of Iowa, have invented a new and useful Improvement in Water-Proof Compounds; and I do hereby declare that the following is a full, clear, and exact description of the same.

This invention relates to certain new and useful improvements in the class of compounds used for preserving wood and metal from the action of water, snow, heat, and cold by rendering the same water-proof.

The invention consists of the following ingredients, combined in about the proportions stated, to wit: I take of coal-tar, twenty (20) gallons; air-slaked lime, twelve (12) pounds; Spanish brown, seven (7) pounds; sulphur, six (6) pounds; litharge, two (2) pounds; fine salt, eight (8) pounds, and of American ocher, seven (7) pounds. The dry ingredients are thoroughly pulverized and sifted through a fine sieve. I bring the coal-tar to a boiling heat, and then add ingredients above named, and the whole is thoroughly mixed together. The mixture is applied hot with a brush to a dry surface. The lime and litharge form a body, and also act as driers, and prevent it from running.

Having thus described my invention, what I claim as new, and desire to secure by Letters Patent, is—

The herein-described compound, consisting of coal-tar, air-slaked lime, Spanish brown, sulphur, litharge, fine salt, and American ocher, in substantially the proportions specified.

In testimony whereof I have signed my name to this specification in the presence of two subscribing witnesses.

OSCAR F. PARSONS.

Witnesses:
J. B. THOMPSON,
FRANK L. MIDDLETON.